(12) United States Patent
Guest et al.

(10) Patent No.: US 8,664,318 B2
(45) Date of Patent: Mar. 4, 2014

(54) CONFORMABLE SCREEN, SHAPE MEMORY STRUCTURE AND METHOD OF MAKING THE SAME

(75) Inventors: Randall V. Guest, Spring, TX (US); Michael H. Johnson, Katy, TX (US); Kirk J. Huber, Magnolia, TX (US)

(73) Assignee: Baker Hughes Incorporated, Houston, TX (US)

( * ) Notice: Subject to any disclaimer, the term of this patent is extended or adjusted under 35 U.S.C. 154(b) by 169 days.

(21) Appl. No.: 13/029,729

(22) Filed: Feb. 17, 2011

(65) Prior Publication Data

US 2012/0211413 A1 Aug. 23, 2012

(51) Int. Cl.
*C08K 3/08* (2006.01)

(52) U.S. Cl.
USPC ................. 524/439; 524/404; 524/494

(58) Field of Classification Search
USPC ................. 524/404, 439, 492–496
See application file for complete search history.

(56) References Cited

U.S. PATENT DOCUMENTS

| | | |
|---|---|---|
| 1,352,493 A | 9/1920 | Wolffgram |
| 3,089,187 A | 5/1963 | Wolfe |
| 3,371,793 A | 3/1968 | Fowler |
| 3,566,653 A | 3/1971 | Unrath |
| 3,695,076 A | 10/1972 | Kocks |
| 3,892,832 A | 7/1975 | Schey |
| 3,933,557 A | 1/1976 | Pall |
| 4,214,612 A | 7/1980 | de Putter |
| 4,260,096 A | 4/1981 | Samarynov et al. |
| 4,358,064 A | 11/1982 | Garneau |
| 4,363,845 A | 12/1982 | Hartmann |
| 4,474,845 A | 10/1984 | Hagerman et al. |
| 4,577,481 A | 3/1986 | Staat |
| 4,592,782 A * | 6/1986 | Davies ............... 75/253 |
| 4,621,999 A | 11/1986 | Gerhardt |
| 4,807,525 A | 2/1989 | de Brock |
| 4,816,106 A | 3/1989 | Turris et al. |
| 4,924,568 A | 5/1990 | Sato et al. |
| 5,032,622 A | 7/1991 | Herrington et al. |
| 5,049,591 A | 9/1991 | Hayashi et al. |
| 5,098,776 A | 3/1992 | Kobayashi et al. |
| 5,120,380 A | 6/1992 | Strachan |
| 5,207,960 A | 5/1993 | Moret de Rocheprise |
| 5,230,726 A | 7/1993 | Smith et al. |
| 5,242,651 A | 9/1993 | Brayden et al. |
| 5,324,117 A * | 6/1994 | Matsushita et al. ........ 384/36 |
| 5,429,847 A | 7/1995 | Ando et al. |
| 5,501,832 A | 3/1996 | Adams |
| 5,503,784 A | 4/1996 | Balk |
| 5,520,758 A | 5/1996 | Kelman et al. |
| 5,533,370 A | 7/1996 | Kuroda et al. |
| 5,565,049 A | 10/1996 | Simmons et al. |
| 5,770,016 A | 6/1998 | Greve |
| 5,964,798 A | 10/1999 | Imran |
| 6,281,289 B1 | 8/2001 | Maugans et al. |
| 6,302,676 B1 | 10/2001 | Kato et al. |
| 6,321,503 B1 | 11/2001 | Warren |
| 6,342,283 B1 | 1/2002 | Mozelack et al. |
| 6,388,043 B1 | 5/2002 | Langer et al. |
| 6,472,449 B1 | 10/2002 | Heinemann et al. |
| 6,521,555 B1 | 2/2003 | Bodaghi et al. |
| 6,560,942 B2 | 5/2003 | Warren et al. |
| 6,583,194 B2 | 6/2003 | Sendijarevic |
| 6,769,484 B2 | 8/2004 | Longmore |
| 6,817,441 B2 | 11/2004 | Murakami et al. |
| 6,827,764 B2 | 12/2004 | Springett et al. |
| 6,935,432 B2 | 8/2005 | Nguyen |
| 6,986,855 B1 | 1/2006 | Hood et al. |
| 7,048,048 B2 | 5/2006 | Nguyen et al. |
| 7,134,501 B2 | 11/2006 | Johnson et al. |
| 7,155,872 B2 | 1/2007 | Francom |
| 7,552,767 B2 | 6/2009 | Wood |
| 7,644,773 B2 | 1/2010 | Richard |
| 7,677,321 B2 | 3/2010 | Spray |
| 7,712,529 B2 | 5/2010 | Dusterhoft et al. |
| 7,743,835 B2 | 6/2010 | Willauer |
| 7,828,055 B2 | 11/2010 | Willauer et al. |
| 2002/0144822 A1 | 10/2002 | Hackworth et al. |
| 2003/0213380 A1 | 11/2003 | Sebastian et al. |
| 2004/0241410 A1 * | 12/2004 | Fischer et al. ........... 428/292.1 |
| 2005/0056425 A1 | 3/2005 | Grigsby et al. |
| 2005/0126699 A1 | 6/2005 | Yen et al. |
| 2005/0205263 A1 | 9/2005 | Richard |

(Continued)

FOREIGN PATENT DOCUMENTS

| EP | 0177167 A1 | 4/1986 |
|---|---|---|
| JP | 06-047219 A | 2/1994 |

(Continued)

OTHER PUBLICATIONS

Notification of Transmittal of the International Search Report and the Written Opinion of the International Searching Authority; PCT/US2012/021273; Korean Intellectual Property Office; Mailed Sep. 26, 2012; 8 pages.
Witold M. Sokolowski et al., "Cold hibernated elastic memor(yC HEM) self-deployable structures"; Jet Propulsion Laboratory, California Institute of Technology, Mar. 1, 1999.
SPE Distinguished Lecturer Series[online]; retrieved on Sep. 25, 2009]; retrieved from the internet at: http://www.spe.org/spe-site/spe/spe/events/dl/Ott.pdf.
Notification of Transmittal of the International Search Report and the Written Opinion of the International Searching Authority, PCT/US2011/031768; Mailed Sep. 30, 2011; Korean Intellectual Property Office.
J. Heiland et al., "The Role of the Annular Gap in Expandable Sand Screen Completions"; Society of Petroleum Engineers; SPE Paper No. 86463; Feb. 18-20, 2004.

(Continued)

*Primary Examiner* — Peter Szekely
(74) *Attorney, Agent, or Firm* — Cantor Colburn LLP

(57) ABSTRACT

A shape memory structure includes, an elastic material, and a viscoelastic material commingled with the elastic material. The shape memory structure is reformable from a first shape to a second shape upon exposure to a change in environment that softens the viscoelastic material thereby allowing the shape memory structure to creep under stress stored in the elastic material.

12 Claims, 4 Drawing Sheets

(56) References Cited

U.S. PATENT DOCUMENTS

| | | | |
|---|---|---|---|
| 2005/0272211 A1* | 12/2005 | Browne et al. | 438/296 |
| 2006/0228963 A1 | 10/2006 | Souther et al. | |
| 2007/0044891 A1 | 3/2007 | Sellars et al. | |
| 2007/0211970 A1* | 9/2007 | Nagata et al. | 384/104 |
| 2008/0006413 A1 | 1/2008 | Le Gloahec et al. | |
| 2008/0296020 A1 | 12/2008 | Willauer | |
| 2008/0296023 A1 | 12/2008 | Willauer | |
| 2009/0301635 A1 | 12/2009 | Corre et al. | |
| 2010/0038076 A1 | 2/2010 | Spray et al. | |
| 2010/0144247 A1* | 6/2010 | Lunn et al. | 451/36 |
| 2011/0178237 A1* | 7/2011 | Ono et al. | 524/592 |

FOREIGN PATENT DOCUMENTS

| | | |
|---|---|---|
| JP | 6-210318 | 8/1994 |
| JP | 6210309 A | 8/1994 |
| JP | 3279962 B2 | 4/2002 |
| WO | 2004099560 A1 | 11/2004 |
| WO | 2007106429 | 9/2007 |

OTHER PUBLICATIONS

Lorrie A. Krebs et al., "Pitting Resistance of Nitinol Stents Before and After Implantation"; NACE International; Paper No. 09461; Corrosion Conference and Expo Mar. 22-26, 2009.

G. Scott Lester et al., "Field Application of a New Cleanable and Damage Tolerant Downhole Screen,"; Society of Petroleum Engineers, SPE Paper No. 30132, May 15, 1995.

Jiaxing (Jason) Ren et al., "Studying the Effect of Chemical Aging on the Properties of a Shape Memory Material", Offshore Technology Conference, Paper No. OTC 21317; May 2, 2011.

C.F. Williams et al., "A New Sizing Criterion for Conformable and Nonconformable Sand Screens Based on Uniform Pore Structures"; Society of Petroleum Engineers, SPE Paper No. 98235; Feb. 15-17, 2006.

Notification of Transmittal of the International Search Report and the Written Opinion of the International Searching Authority; PCT/US2012/041239; Mailed Jan. 2, 2013; Korean Intellectual Property Office; 9 pages.

Notification of Transmittal of the International Search Report and the Written Opinion of the International Searching Authority; PCT/US2012/048795; Mailed Feb. 14, 2013; Korean Intellectual Property Office; 10 pages.

Notification of Transmittal of the International Search Report and the Written Opinion of the International Searching Authority; PCT/US2012/048796; Mailed Feb. 8, 2013, Korean Intellectual Property Office; 6 pages.

Notification of Transmittal of the International Search Report and the Written opinion of the International Searching Authority; PCT/US2012/048798; Mailed Feb. 20, 2013, Korean Intellectual Property Office; 8 pages.

* cited by examiner

CONFORMABLE SCREEN, SHAPE MEMORY STRUCTURE AND METHOD OF MAKING THE SAME

BACKGROUND

Filtering contaminates from flowing fluids is a common exercise in systems involved in transportation of fluids. Many such systems employ screens as the filtering mechanism. Screens that expand to substantially fill an annular gap, for example, between concentric tubulars, is another common practice. Some of these systems use swaging equipment to radially expand the screen. Although such equipment serves its purpose it has limitations, including a limited amount of potential expansion, complex and costly equipment and an inability to expand to fill a nonsymmetrical space. Apparatuses that overcome these and other limitations with existing systems are therefore desirable to operators in the field.

BRIEF DESCRIPTION

Disclosed herein is a shape memory structure. The structure includes, an elastic material, and a viscoelastic material commingled with the elastic material. The shape memory structure is reformable from a first shape to a second shape upon exposure to a change in environment that softens the viscoelastic material thereby allowing the shape memory structure to creep under stress stored in the elastic material.

Further disclosed herein is a conformable screen. The screen includes, a structure having, an elastic material and a viscoelastic material commingled with the elastic material, a filter material, and a permeable tubular. The structure is reformable from a first shape to a second shape upon exposure to a first environment that softens the viscoelastic material to thereby allow the structure to creep under stress stored in the elastic material. The filter material is positioned within the structure and is compressible such that the filter material is maintained in a smaller volume when the structure is in the first shape than when the structure is in the second shape. The permeable tubular is in operable communication with the structure such that fluid flowable through one of the filter material and permeable tubular are subsequently flowable through the other of the filter material and the permeable tubular Further disclosed herein is a method of making a shape memory structure. The method includes, commingling elastic material with viscoelastic material, and forming a structure with the commingled materials. Altering a shape of the structure, altering an environment the structure is exposed to, to lock in the altered shape of the structure via hardening of the viscoelastic material until the structure is exposed to another environment that softens the viscoelastic material.

Further disclosed herein is a method of making a conformable screen. The method includes, commingling elastic material with viscoelastic material, forming a structure with the commingled materials, surrounding a permeable tubular with the structure, and positioning filter material within the structure. The method further includes, compacting the structure and the filter material into a compaction and altering an environment the compaction is exposed to, to maintain a volume of the compaction until the compaction is exposed to another environment

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
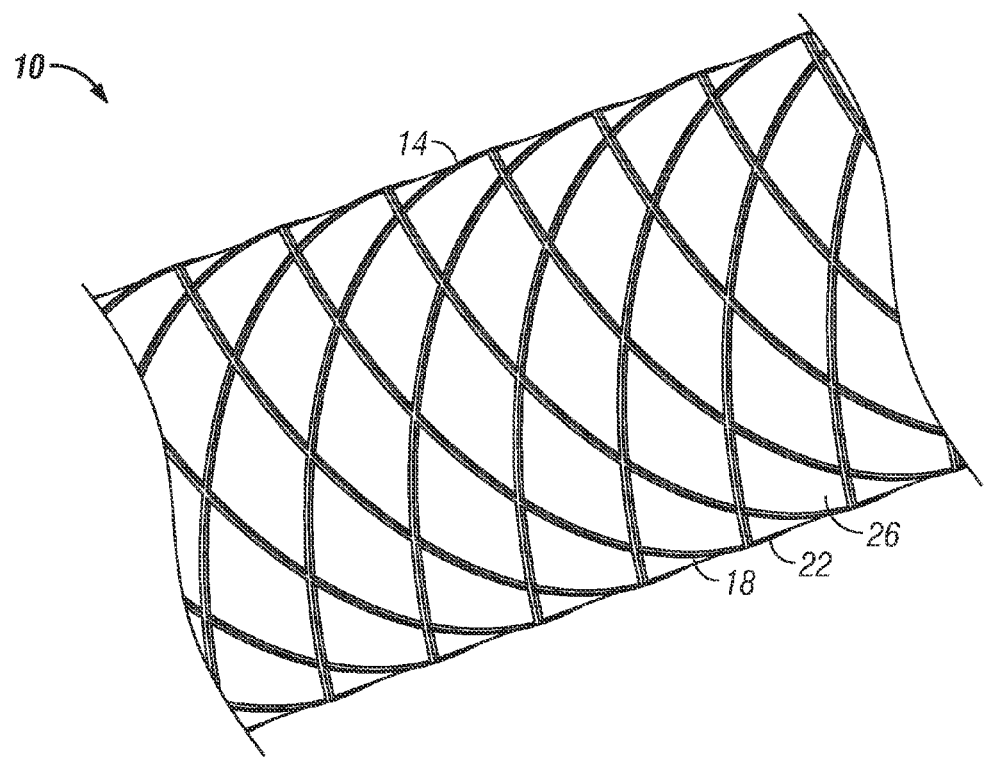
FIG. 1 depicts a perspective view of a conformable screen disclosed herein.
Figure 2:
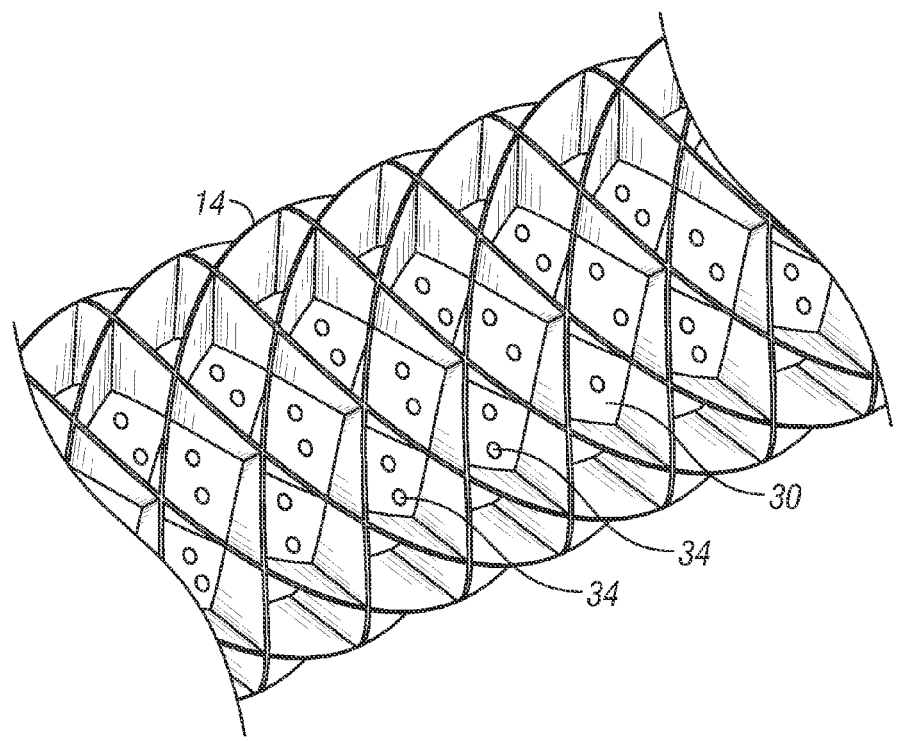
FIG. 2 depicts a perspective view of the conformable screen of FIG. 1 with the filter material removed in an un-compacted configuration.
Figure 3:
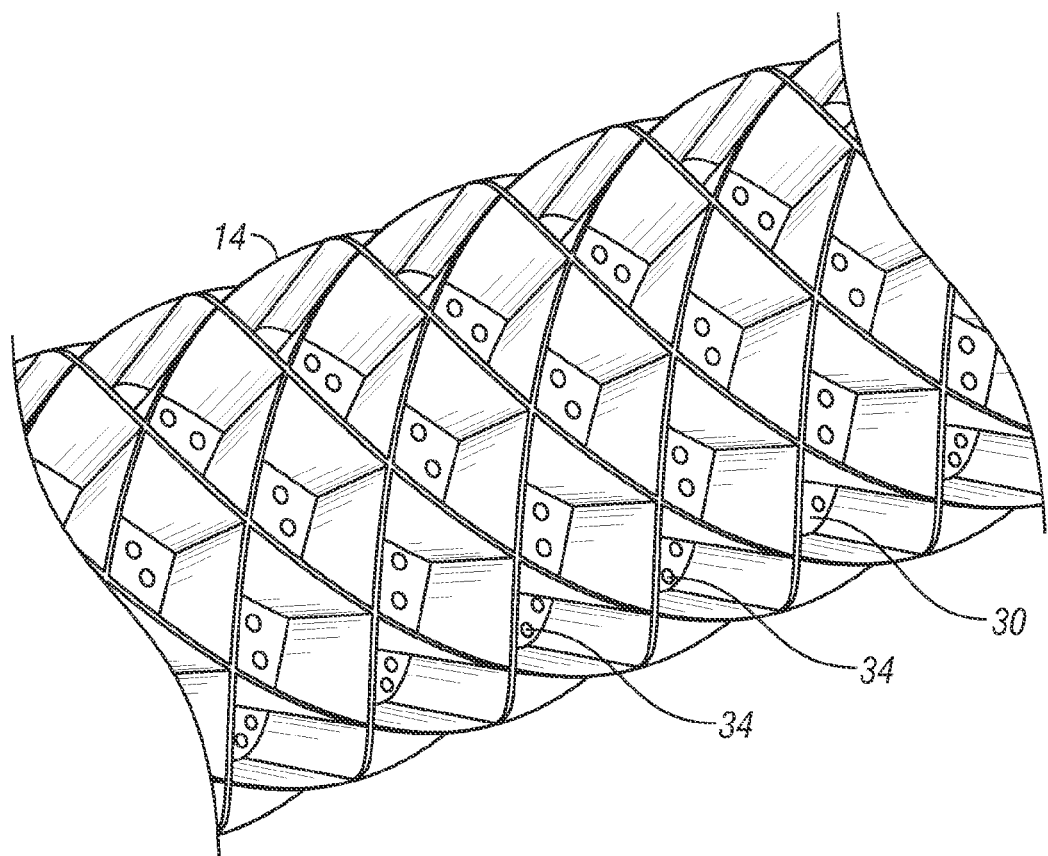
FIG. 3 depicts a perspective view of the conformable screen of FIG. 2 in a compacted configuration.
Figure 4:
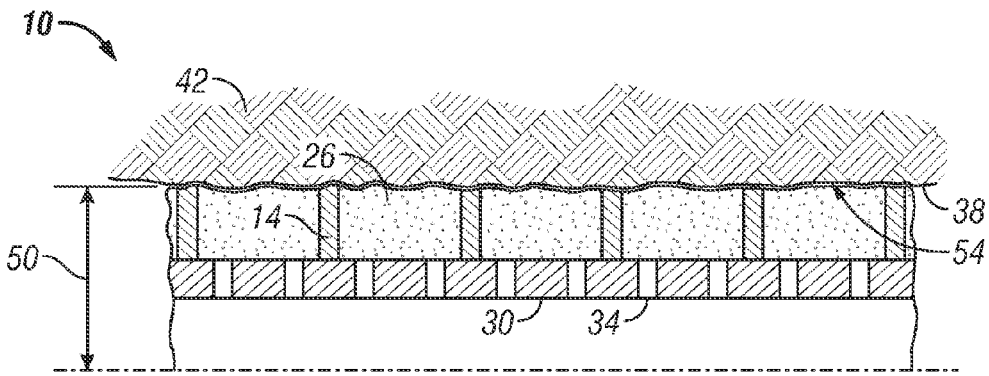
FIG. 4 depicts a partial cross sectional view of the conformable screen of FIG. 2 with the filter material present.
Figure 5:
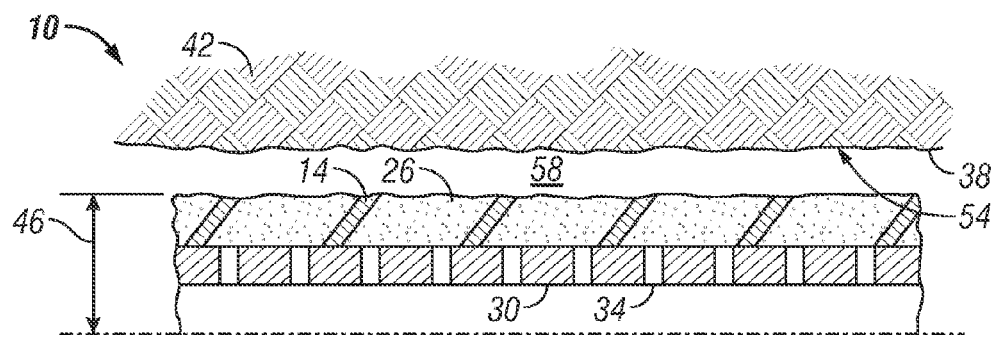
FIG. 5 depicts a partial cross sectional view of the conformable screen of FIG. 3 with the filter material present.

Referring to FIGS. 1-5, an embodiment of a conformable screen disclosed herein is illustrated at 10. The conformable screen 10 includes a structure 14 made of at least two commingled materials, an elastic material 18 and a viscoelastic material 22 (shown in greater detail in FIG. 6). The structure 14, illustrated herein as a facetted structure, is reformable from a first shape, or compaction (as shown in FIGS. 3 and 5) to a second shape (as shown in FIGS. 2 and 4) upon exposure to an environment that softens the viscoelastic material 22 thereby allowing the facetted structure 14 to creep under stress stored in the elastic material 18. The conformable screen 10 further includes a filter material 26 positioned within the facetted structure 14. The filter material 26 may have a mat or foam structure, such as a polyester fiber batting or an open-cell polyurethane form, for example, although embodiments are not limited to these structures. The filter material 26 is volumetrically compactable or compressible and once compacted can be maintained at a smaller volume until allowed to return to its un-compacted larger volume. The filter material 26, being positioned within the facetted structure 14, can be maintained in the compacted condition by the facetted structure 14. The facetted structure 14 and the filter material 26 are positioned radially of a permeable tubular illustrated in this embodiment as a perforated tubular 30 of the conformable screen 10. As such, fluid is able to flow through perforations 34 in the perforated tubular 30 after flowing through the filter material 26, and being filtered in the process. Alternately, fluid flowing in a reverse direction could flow through the filter material 26 after flowing through the perforations 34.

Referring specifically to FIGS. 4 and 5, the conformable screen 10 is shown employed in a borehole 38 in an earth formation 42 such as when used in a hydrocarbon recovery application or a carbon dioxide sequestration application, for example. The conformable screen 10 is run into the borehole 38 when in the first shape, or compaction, wherein the facetted structure 14 is hardened and maintains the filter material 26 in the smaller volume configuration. The conformable screen 10 has a first radial dimension 46 when in the first shape and a second radial dimension 50 when in the second shape. The first radial dimension 46 is smaller than the second radial dimension 50, thereby providing radial clearance between the conformable screen 10 and the borehole 38 while running the conformable screen 10 therewithin. Once the conformable screen 10 is positioned at a selected location within the borehole 38, exposure of the conformable screen 10, and more particularly of the facetted structure 14, to an alternate environment causes a softening of the viscoelastic material 22 thereby allowing stresses within the elastic material 18 to cause the facetted structure 14 to change from the first shape to the second shape (it should be noted that, although not required, the filter material can also provide loads that assist in returning the facetted structure 14 from the first shape to the second shape). In so doing the conformable screen 10 undergoes a change from the first radial dimension 46 toward the second radial dimension 50 resulting in contact between the filter material 26 and walls 54 of the borehole 38 in the process. The contact between the filter material 26 and the walls 54 minimizes or eliminates annular clearance 58 therebetween and erosion that could result due to fluid flow if the annular clearance 58 were allowed to exist. The contact between the filter material 26 and the walls 54 also provides support to the walls 54 lessening the potential for undesirable conditions such as collapses and voids in the formation 42, for example.

Figure 6:
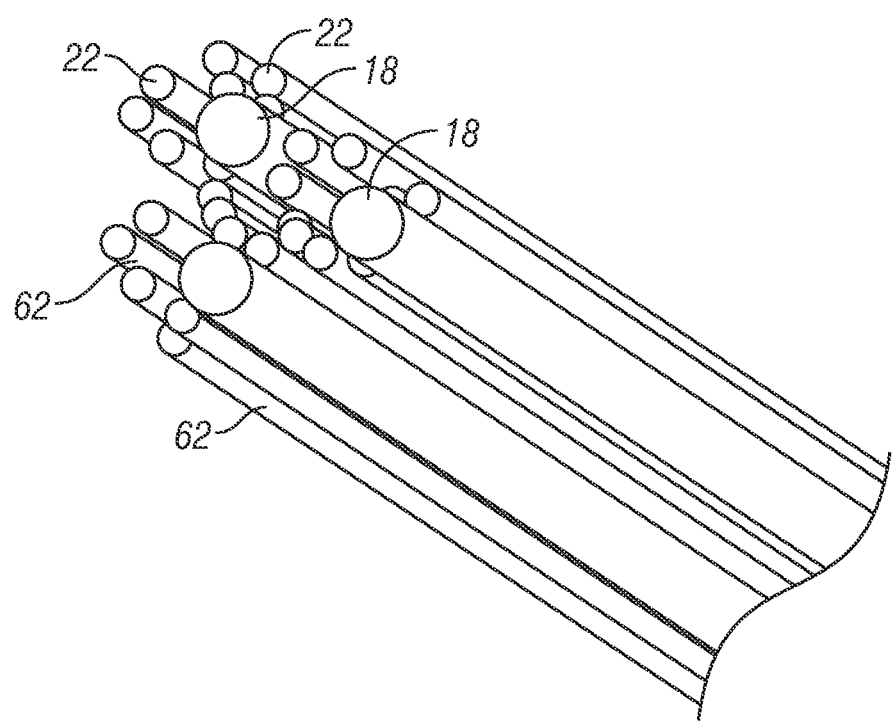
FIG. 6 depicts a schematic view of commingled fibers of elastic and viscoelastic materials disclosed herein.

Referring to FIG. 6, an embodiment illustrating how the elastic material 18 and the viscoelastic material 22 may be commingled is illustrated. In this embodiment the elastic material 18 and the viscoelastic material 22 are formed into fibers 62 or fibrils such that the fibers 62 of the viscoelastic material 22 effectively surround the fibers 62 of the elastic material 18. The commingled fibers 62 are formed into the facetted structure 14. The elastic material 18 has different chemical, mechanical and structural characteristics to provide the facetted structure 14 with the shape memory properties described above. The elastic material 18 may be one of aramid, glass, boron, basalt, carbon, graphite, quartz, liquid crystal polymer, aluminum, titanium and steel, for example that has a relatively high modulus to provide structure and memory of the original shape to the facetted structure 14.

The viscoelastic material 22 on the other hand may be a thermoplastic polymer such as polyether ether ketone (PEEK), for example, that melts around the fibers 62 of the elastic material 14 during fabrication. The viscoelastic material 22 provides the capacity to be softened in some environments and hardened in others. In the example of the thermoplastic polymer for the viscoelastic material 22 temperature is the changeable environment. As such, heating will soften the viscoelastic material 22 allowing it to creep under loads such as compaction loads applied to cause the facetted structure 14 to be reshaped from the second shape to the first shape. Cooling of the facetted structure 14 allows the viscoelastic material 22 to harden and lock in the first shape until the environment (temperature) is increased to again soften the viscoelastic material 22 thereby allowing it to again creep under load. By configuring the facetted structure 14 and in particular the elastic material 18 therewithin to undergo only elastic deformation when reshaped from the second shape to the first shape, the elastic material 18 will maintain a load on the viscoelastic material 22 all the while that the structure is locked in the first shape. It is this stress locked in the elastic material 18 that allows the facetted structure 14 to creep back from the first shape to the second shape once the viscoelastic material 22 has again been softened by the increase in temperature.

Although the embodiment illustrated herein employs a thermoplastic polymer as the viscoelastic material 22 that hardens and then softens in response to changes in temperature, alternate embodiments could be employed that use other changes in environment to cause the viscoelastic material 22 to harden and soften. Examples include materials that respond to changes in humidity and changes in available plasticizers.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A shape memory structure, comprising:
an elastic material; and
a viscoelastic material commingled with the elastic material, the shape memory structure being reformable from a first shape to a second shape upon exposure to a change in environment that softens the viscoelastic material thereby allowing the shape memory structure to creep under stress stored in the elastic material, and the shape memory structure being configured to maintain a filter material, not being one of the elastic material or the viscoelastic material, in a smaller volume when in the first shape than when in the second shape.

2. The shape memory structure of claim 1, wherein the stress stored in the elastic material is generated in the elastic material by a mechanical load and maintained therein by the viscoelastic material being exposed to a change in environment that hardens the viscoelastic material thereby preventing the shape memory structure from creeping under the stress stored in the elastic material.

3. The shape memory structure of claim 1, wherein the elastic material is from the group consisting of aramid, glass, boron, basalt, carbon, graphite, quartz, liquid crystal polymer, aluminum, titanium and steel.

4. The shape memory structure of claim 1, wherein the viscoelastic material is a polymer.

5. The shape memory structure of claim 1, wherein the viscoelastic material is polyether ether ketone.

6. The shape memory structure of claim 1, wherein at least one of the viscoelastic material and the elastic material is in the form of a fiber.

7. The shape memory structure of claim 1, wherein the shape memory structure is formed into a facetted structure.

8. The shape memory structure of claim 1, wherein the change in environment includes at least one of a change in temperature, a change in humidity and a change in plasticizer.

9. The shape memory structure of claim 7, wherein the filter material urges the shape memory structure from the first shape toward the second shape.

10. The shape memory structure of claim 1, wherein the filter material has a foam structure.

11. The shape memory structure of claim 7, wherein the facetted structure has a tubular shape.

12. The shape memory structure of claim 11, wherein the second shape has a larger radial dimension than the first shape.

* * * * *